US008015149B1

(12) United States Patent
Anastasopoulos et al.

(10) Patent No.: US 8,015,149 B1
(45) Date of Patent: Sep. 6, 2011

(54) ASSET REPOSITORY (75) Inventors: Paul Anastasopoulos, Santa Cruz, CA (US); Frederick A. Aliaga, Tracy, CA (US)

(73) Assignee: Adobe Systems Incorporated, San Jose, CA (US)

( * ) Notice: Subject to any disclaimer, the term of this patent is extended or adjusted under 35 U.S.C. 154(b) by 476 days.

(21) Appl. No.: 12/009,129

(22) Filed: Jan. 15, 2008

(51) Int. Cl.
*G06F 17/30* (2006.01)

(52) U.S. Cl. ............................................. 707/610

(58) Field of Classification Search ........... 705/28; 715/201; 709/223, 217; 707/625, 634, 639–641, 707/644, 648–653, 674–682, 686, 821, 638, 707/656, 657, 610–614, 617, 751
See application file for complete search history.

(56) References Cited

U.S. PATENT DOCUMENTS

| | | | |
|---|---|---|---|
| 6,801,914 B2 * | 10/2004 | Barga et al. .................. 707/674 |
| 6,839,843 B1 | 1/2005 | Bacha et al. | |
| 6,912,529 B1 | 6/2005 | Kolfman | |
| 7,003,560 B1 * | 2/2006 | Mullen et al. .................. 709/223 |
| 7,181,466 B2 | 2/2007 | Bennet et al. | |
| 7,234,117 B2 * | 6/2007 | Zaner et al. .................. 715/758 |
| 7,325,042 B1 * | 1/2008 | Soscia et al. .................. 709/219 |
| 7,739,235 B2 * | 6/2010 | Rousseau et al. .............. 707/610 |
| 2001/0056463 A1 * | 12/2001 | Grady et al. .................. 709/203 |
| 2003/0063771 A1 | 4/2003 | Morris et al. | |
| 2003/0144892 A1 | 7/2003 | Cowan | |
| 2003/0225832 A1 * | 12/2003 | Ludwig ........................ 709/204 |
| 2004/0113948 A1 * | 6/2004 | Shahrbabaki et al. ........ 345/777 |
| 2004/0243556 A1 | 12/2004 | Ferrucci et al. | |
| 2005/0060299 A1 | 3/2005 | Filley et al. | |
| 2006/0190829 A1 * | 8/2006 | Zaner et al. .................. 715/751 |
| 2007/0299835 A1 | 12/2007 | Takeuchi | |
| 2008/0052358 A1 * | 2/2008 | Beaven et al. ................ 709/205 |

* cited by examiner

*Primary Examiner* — Greta L Robinson (74) *Attorney, Agent, or Firm* — Robert C. Kowert; Meyertons, Hood, Kivlin, Kowert & Goetzel, P.C.

(57) ABSTRACT

Techniques for an asset repository are described, including storing an asset from a system in a repository, where the asset remains stored in a repository when power is removed from the system, the system including an application configured to access the asset and the repository, and configuring the repository to be accessed by the system and another system.

16 Claims, 12 Drawing Sheets

ASSET REPOSITORY

FIELD OF THE INVENTION

The present invention relates generally to software and repositories. More specifically, techniques for an asset repository are described.

BACKGROUND

In conventional methods, assets are stored and filed on a system hard drive, a shared server, or an online server. Assets are any type of media, including, for example, text, images, sound files, colors, movie clips, documents, URLs, and folders. Typically, assets are stored in many locations, sometimes far removed from the application itself. A conventional method of using "Open" dialog or browsing for the asset is cumbersome and constricted. Further, collaborative design environments are constrained by the conventional methods of asset sharing that are largely dependent on detailed notifications of what assets are available and where the assets reside (i.e., are stored or housed).

A OS (Operating System) clipboard is a conventional method of holding some media types for use within multiple applications. However, the OS clipboard storage is temporary, only holding assets until the system is shutdown. Further, assets held in the OS clipboard cannot be shared between multiple systems. Thus, the assets stored are not available to multiple users.

Thus, a solution for an asset repository without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, AIR™, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Fireworks®, and InDesign® may also be used to implement the described techniques. The described techniques may be varied and are not limited to the examples or descriptions provided.

Techniques for an asset repository are described. Computer programs, software, or applications used to create or modify text, visual, graphic, audio, video, or other types of content, presentations, and graphical user interfaces (GUIs) may be used to provide a repository for storing and accessing assets. Assets may include any type of media, including, for example, text, images, sound files, colors, movie clips, documents, URLs, and folders. As an example, a repository may be accessed from multiple applications, including software applications, web browsing applications, and a system desktop. In some examples, a repository may be a window within an application. In other examples, a repository is a window attached to the side of an application. In still other examples, a repository is a window on the system desktop. Thus, a user may easily access a repository and the assets housed within a repository from any application without exiting the application. Changes to a repository may be duplicated across some, all, or none of the instances of a repository. Although a repository may have multiple instances in various applications and there may be a display associated with the repository presented (i.e., displayed) within each of the applications, each instance of a repository may be updated with a current version of the assets. For example, if an asset is added to a repository in one application, that asset may be added in each instance of the repository accessed from other applications. As another example, if an asset is removed from a repository in one application, that asset may be removed from each instance of the repository in other applications. Further, a repository may be accessed from multiple systems, allowing multiple users to access the same repository and enabling sharing of assets between colleagues, clients, vendors, or other types of users.

Figure 1:
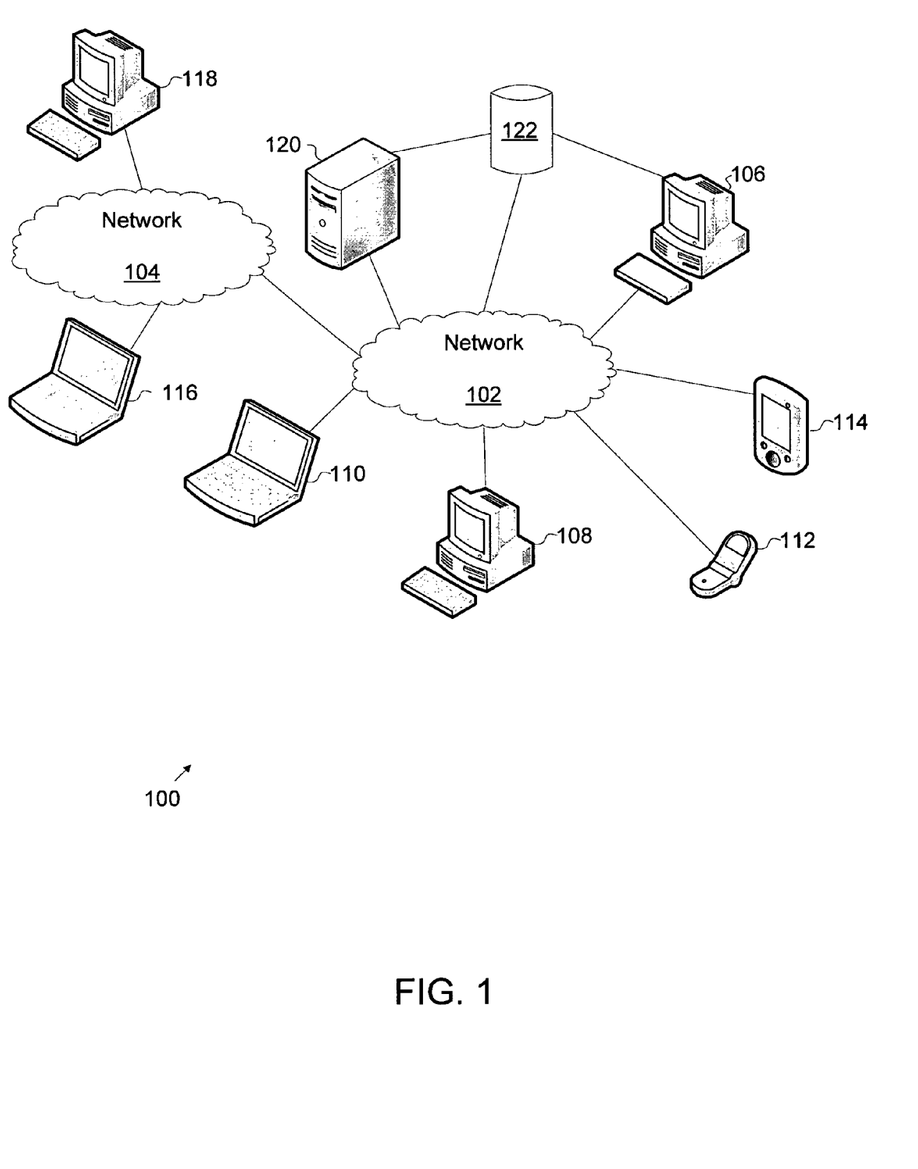
FIG. 1 illustrates an exemplary system for an asset repository.

FIG. 1 illustrates an exemplary system for an asset repository. Here, system 100 includes networks 102-104, clients 106-118, server 120, and database 122. System 100 may be used to implement the described techniques for an asset repository. In some examples, networks 102-104 may be implemented using the Internet, a local area network (LAN), wide area network (WAN), municipal area network (MAN), wireless local area network (WLAN), or any other type or topology of network apart from those described herein. Further, direct and indirect connections and couplings may be provided between clients 106-118 across networks 102-104. The direct and indirect connections and couplings may be implemented using one or more networks. As an example, clients 106-118 may be implemented using a desktop or laptop computer, mobile computing device, personal digital assistant (PDA), smart phone, camera phone, or any other type of computing device. System 100 is not limited to any particular type of client and various types other than those described above may be used. Further, network connections or couplings between the above-described elements in system 100 may be varied and are also not limited to the examples provided.

In other examples, server 120 may be implemented and used to deliver (i.e., serve) content, information, or data requested by one or more of clients 106-118. For example, content requested by client 106 may be performed using a web browsing application (not shown) installed on client 106. Content may include text, documents, files, images, photos, applications, or any type of information or data. When requested from server 120, content may be delivered to the requesting client (i.e., clients 106-118). In other examples, server 120 may be a server configured for a given purpose (e.g., ad server, web server, content server, application server, web services, gateway, and others). In yet other examples, server 120 may be a server network configured for a given purpose (e.g., ad server, web server, content server, application server, web services, gateway, and others).

Techniques for an asset repository such as those described herein may be implemented using the above-described system and topology. In some examples, techniques for an asset repository may be performed locally on one or more of clients 106-118. In other examples, techniques for an asset repository may be performed remotely or in a distributed manner using server 120, one or more of clients 106-118, and networks 102-104. Further, other system configurations, topologies, clients, end devices, and intermediate devices, and implementation techniques may be used and are not limited to those described above.

Figure 2:
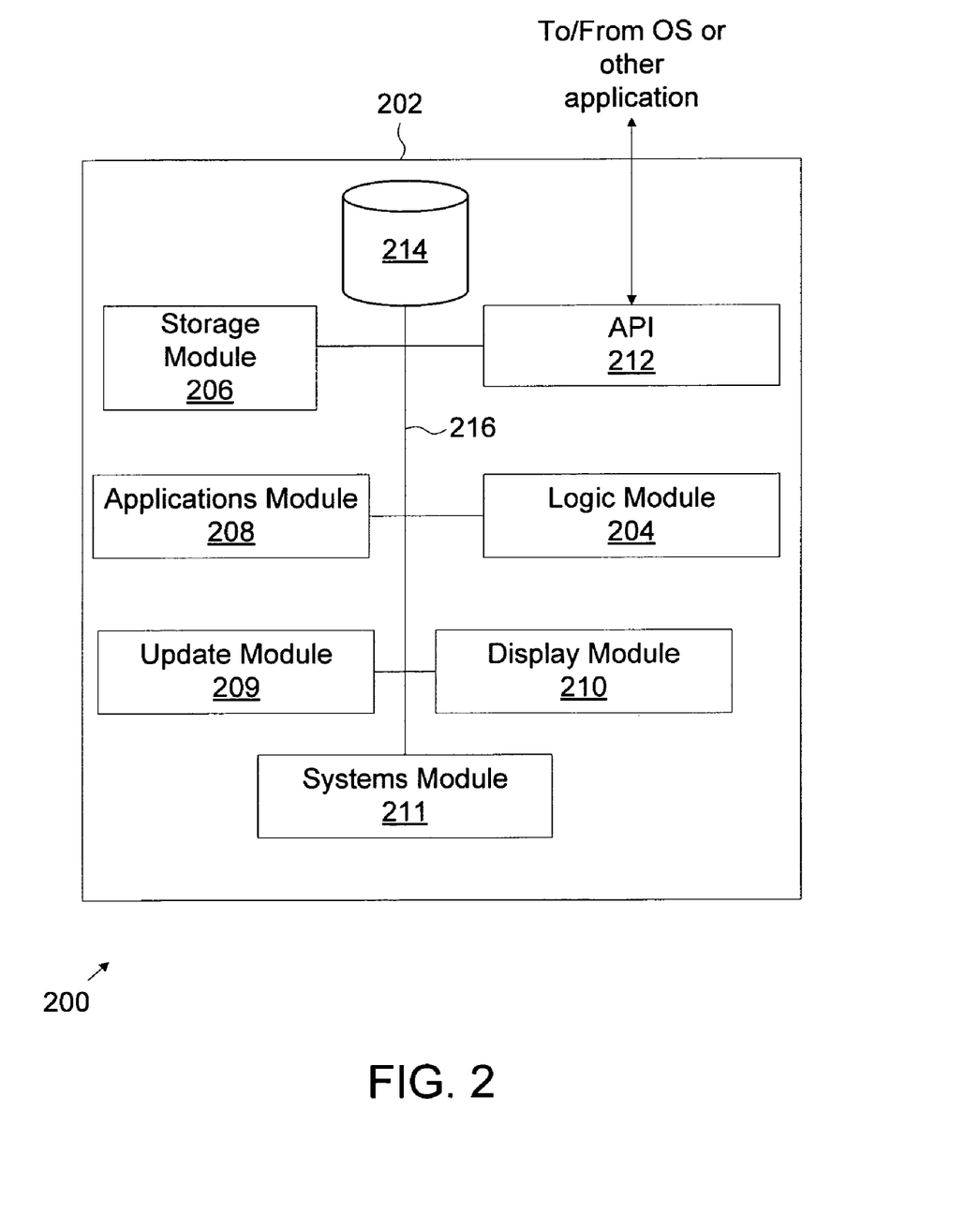
FIG. 2 illustrates an exemplary application for an asset repository.

FIG. 2 illustrates an exemplary application for an asset repository. Here, system 200 includes application 202, logic module 204, storage module 206, applications module 208, update module 209, display module 210, systems module 211, application programming interface (API) 212, storage 214, and data bus 216. Logic module 204, storage module 206, applications module 208, update module 209, display module 210, systems module 211, API 212, and storage 214 may be configured to transfer data between each of the above-described elements using data bus 216. In some examples, storage 214 may be a local storage repository or memory implemented on a device running application 202. In other examples, storage 214 may be implemented as part of application 202 (as shown) or as a separate element included on the same device as application 202. In yet other examples, storage 214 may be a remote repository, which may be networked directly or indirectly to application 202. Data associated with an asset repository may be stored in either storage 214 or a remote repository (not shown), and data may be organized into files. Files may include data associated with documents, images, text, applications, video, audio, applications, program or software code, photos, or any other type of data that may be grouped together as a stream of bits (e.g., "1," "0," or any other data representation using binary, tertiary, or any other type of number system using a different mathematical base) that may be opened, accessed, launched, executed, run, downloaded, copied, removed, or otherwise operated upon as a single unit or instantiation. Further, files may include content such as text, images, spreadsheets, digital videos, digital audios, advertisements, web sites and pages, documents, articles, web services-delivered content and applications, or other content formatted in various types of formats using different applications. In some examples, files, when retrieved from storage 214 may be opened and launched based on the type of file retrieved. For example, a video file may be downloaded, retrieved, streamed, or otherwise accessed from storage 214. As another example, a web site having video and audio data may be streamed as a data stream from storage 214. Further, application 202 may be implemented as part of another application or as a separate application in data communication with other applications (e.g., operating systems, applications, and others) using API 212.

Storage module 206 may be configured to store an asset from a system in a repository. In some examples, storage module 206 may be configured to store an asset from a system in storage 214. When the asset has been stored in storage 214, the asset remains stored, even if power is removed from the system. Applications module 208 may be configured to provide access to the asset in a repository from one or more applications, including software applications, web browsing applications, and a system desktop. Systems module 211 may be configured to provide access to the asset in a repository from one or more systems. Since systems module 211 provides access to the asset from one or more systems, multiple users may have access to the asset.

Display module 210 may be configured to provide a graphical interface (e.g., a display) configured to access the asset in a repository. In some examples, display module 210 may provide a display of a repository with the asset within an application. In other examples, display module 210 may provide a display of a repository with the asset in a window attached to an application. In still other examples, display module 210 may provide a display of a repository in a movable window on a system desktop or a locked position on a system desktop.

Update module 209 may be configured to update multiple instances of a repository. For example, if an asset is added to a repository in one application, update module 209 updates repositories in other applications to also include the added asset. As another example, if an asset is removed from a repository in one application, update module 209 updates the repositories in other applications to also remove the deleted asset. Thus, multiple instances of a repository are synchronized and updated. A transaction flow initiated by an interaction to access or update an asset in a repository may be communicated using API 212 from another application or operating system (OS). In some examples, an interaction to access or update an asset includes adding an asset to a repository. In other examples, an interaction to access or update an asset includes removing an asset from a repository. Logic module 204 may be implemented to provide logic, control, coordination, command, signaling, and other functions and features for application 202. For example, logic module 204 may be configured to coordinate between update module 209 and display module 210 when a repository has been updated and a display of a repository is changed accordingly. In other examples, system 200 and the described elements may be varied in implementation, function, or structure and are not limited to the examples provided.

Figure 3A:
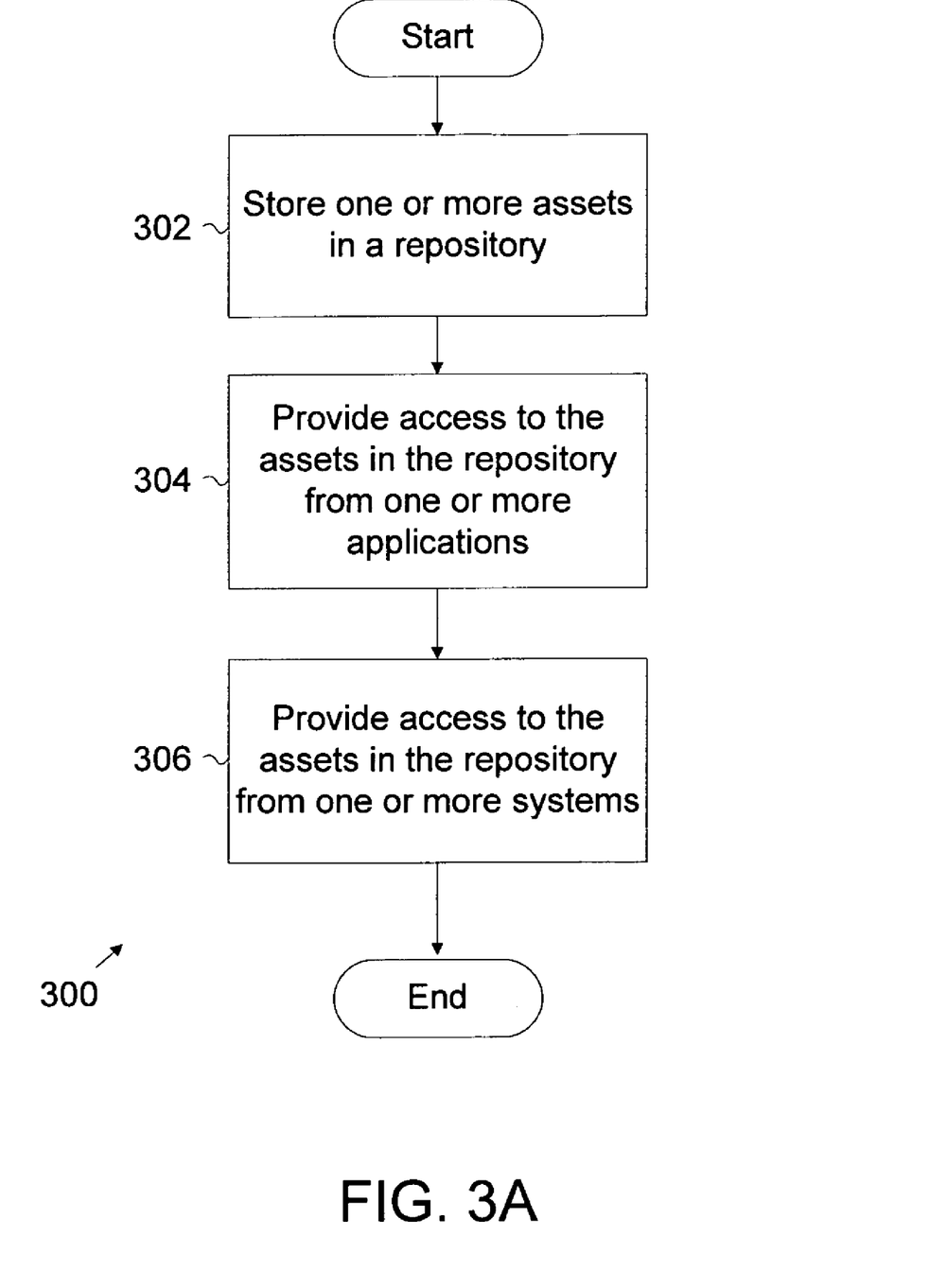
FIG. 3A illustrates an exemplary process for an asset repository.

FIG. 3A illustrates an exemplary process for an asset repository. Here, process 300 starts by storing one or more assets from a system in a repository (302). Once an asset is stored, the asset remains stored in a repository when power is removed from the system. Thus, the asset is not just stored temporarily, but it remains stored even after the system is powered off. Process 300 continues by providing access to the assets in a repository from one or more applications (304). These applications, including software applications, web browsing applications, and system desktops, may be configured to access a repository. In some examples, an application may access a repository through a display of a repository in the application (e.g., in a window or toolbar within the application). In other examples, an application may access a repository through a display of a repository attached to the application (e.g., in a window attached to the right side, left side, top, or bottom of the application). An application may copy an asset from a repository, add an asset to a repository, remove an asset from a repository, or otherwise access the asset in a repository. If multiple applications are configured to access a repository, there is an instance of a repository displayed in each of the applications, resulting in multiple instances of a repository. Updating multiple instances of a repository is discussed in conjunction with FIG. 3B below. Process 300 continues by providing access to the assets in a repository from one or more systems (306). These systems may be configured to access a repository, allowing multiple users to access the same repository and enabling sharing of assets between multiple users. In other examples, the above-described process may be varied and is not limited to the processes or sub-processes described above.

Figure 3B:
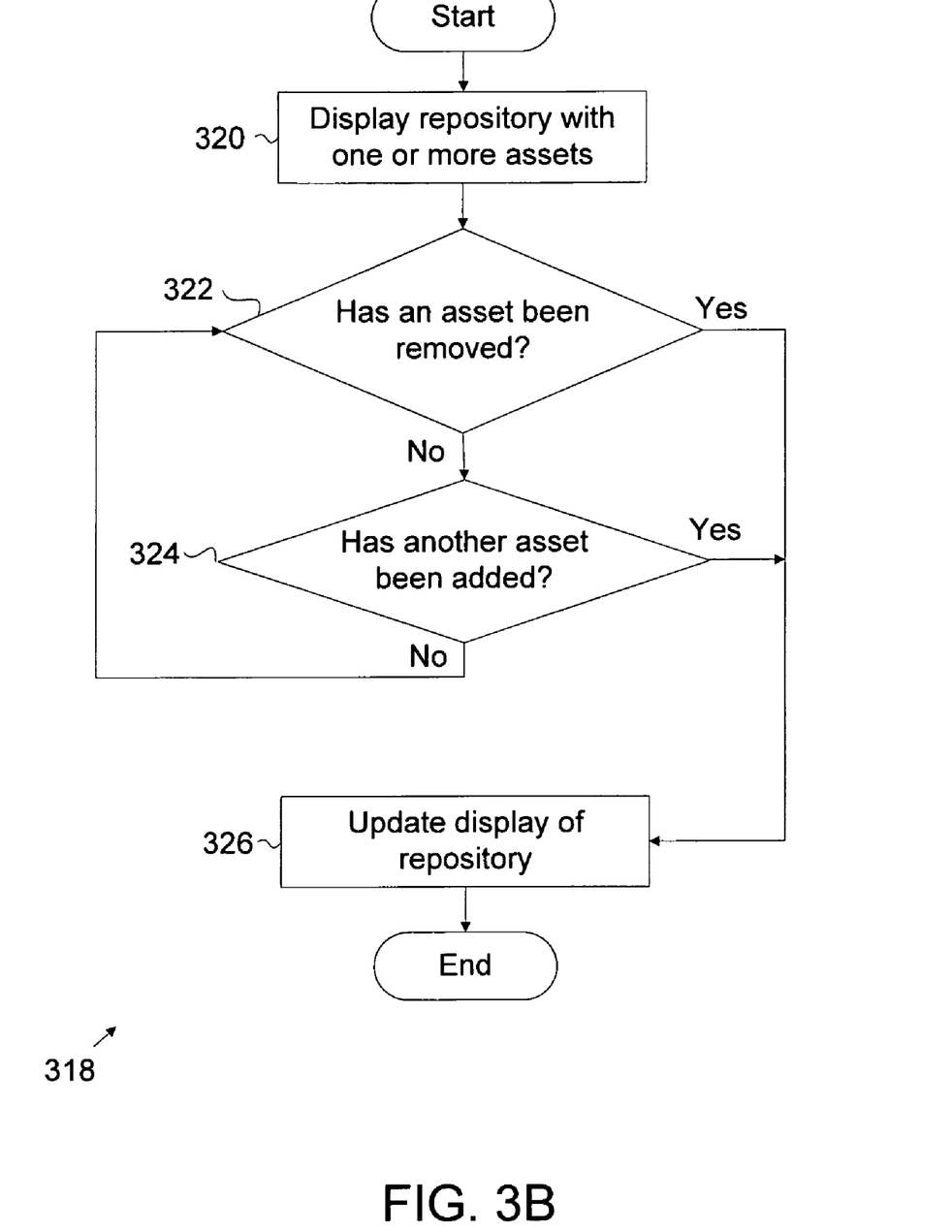
FIG. 3B illustrates an exemplary sub-process for an asset repository.

FIG. 3B illustrates an exemplary sub-process for an asset repository. In some examples, sub-process 318 further describes updating a display of a repository. Here, a repository is displayed with one or more assets (320). The assets in a repository are accessible by one or more applications and one or more systems, as described above in conjunction with FIG. 3A. A determination is made as to whether an asset has been removed from a repository by one of the applications or by one of the systems (322). If an asset has not been removed, another determination is made as to whether an asset has been added to a repository by one of the applications or by one of the systems (324). If an asset has not been added either, the determination is repeated as to whether an asset has been removed or added. If either an asset has been removed from a repository or an asset has been added to a repository by one of the applications or one of the systems, sub-process 318 concludes by updating the display of a repository in the other applications or systems that have been configured to access the repository (326). For example, if three applications (e.g., application A, application B, and application C) are configured to access a repository, each of the applications has a display associated with a repository in connection with the application. If an asset is added to a repository displayed in connection with application A, the repositories displayed in connection with application B and application C are updated to also display the newly-added asset. Similarly, if an asset is removed from a repository displayed in connection with application A, the repositories displayed in connection with application B and application C may also be updated to remove the asset. Thus, multiple instances of a repository are synchronized with each other and each instance of a repository displays the current version of the assets housed (i.e., stored) in a repository. In other examples, the above-described process may be varied and is not limited to the processes or sub-processes described above.

Figure 4A:
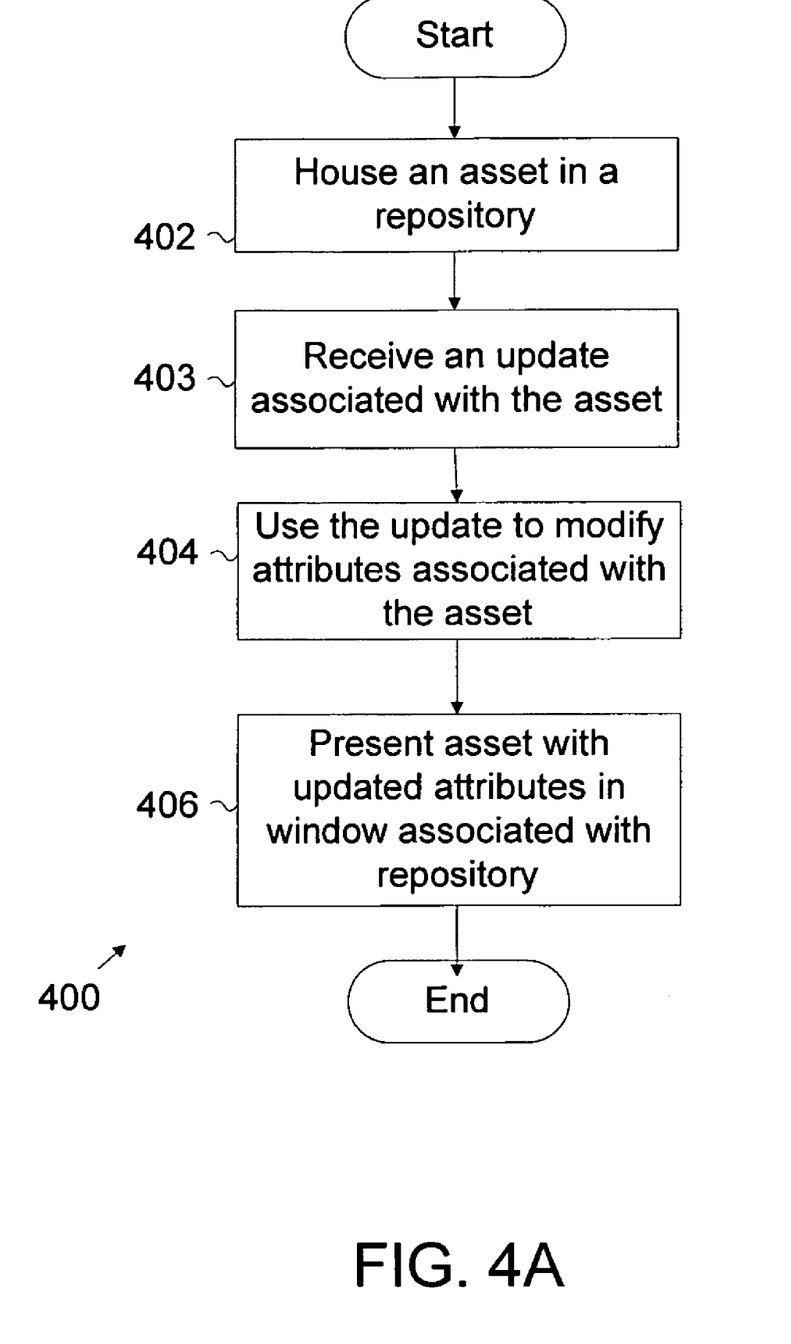
FIG. 4A illustrates an alternative exemplary process for an asset repository.

FIG. 4A illustrates an alternative exemplary process for an asset repository. Here, process 400 starts by housing an asset in a repository (402). A repository may be configured to display the asset in multiple applications, including software applications, web browsing applications, and system desktops, and each of the applications may be configured to access and retrieve the asset. In some examples, an application may access a repository through a display of a repository in the application (e.g., in a window or toolbar within the application). In other examples, an application may access a repository through a display of a repository attached to the application (e.g., in a window attached to the right side, left side, top, or bottom of the application). An application may copy an asset from a repository, add an asset to a repository, remove an asset from a repository, or otherwise access the asset in a repository. If multiple applications are configured to access a repository, there is an instance of a repository displayed in each of the applications, resulting in multiple instances of a repository. Process 400 continues by receiving an update associated with the asset (403). In some examples, the update is configured to modify attributes associated with the asset. An update to the attribute or set of attributes associated with an asset is updated (404). An update associated with the asset may be received from any of the applications configured to access the asset. For example, an update to remove an asset may be received from one application when the asset is removed from a repository in the application. As another example, an update to add an asset may be received from another application when the asset is removed from a repository in that application. After updating the asset, the updated asset is presented (i.e., displayed) in a window presented in association with each of the applications having access to the repository (406). The sub-process of updating the attributes associated with the asset is further described in conjunction with FIG. 4B below. In other examples, the above-described process may be varied and is not limited to the processes or sub-processes described above.

Figure 4B:
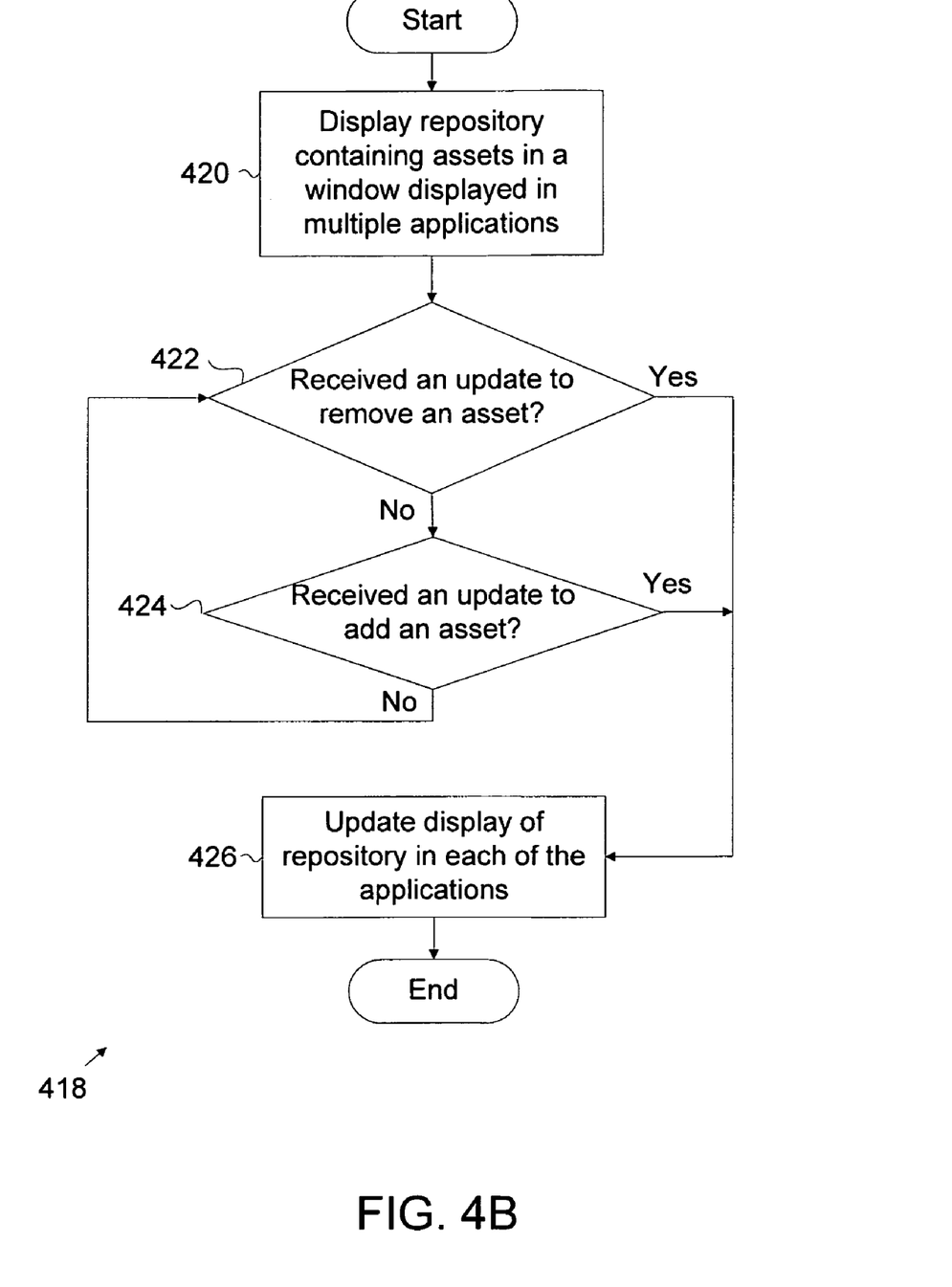
FIG. 4B illustrates an alternative exemplary sub-process for an asset repository.

FIG. 4B illustrates an alternative exemplary sub-process for an asset repository. In some examples, sub-process 418 further describes updating attributes associated with an asset, where the asset is updated and presented in a window displayed in multiple applications. Here, a repository containing assets is displayed in a window in multiple applications (420). The assets in a repository are accessible by one or more applications, as described above in conjunction with FIG. 4A. A determination is made as to whether an update has been received to remove an asset from a repository (422). If an update has not been received, another determination is made as to whether an update has been received, indicating the addition of an asset to a repository (424). If an update has not been received, the determination of whether an update has been received to remove or add an asset is repeated. If either an update has been received to remove an asset or an update has been received to add an asset, sub-process 418 concludes by updating the display of a repository in each of the applications that have been configured to access a repository (426). For example, if three applications (e.g., application A, application B, and application C) are configured to access a repository, each of the applications has a display associated with a repository in connection with the application. If an asset is added to a repository displayed in connection with application A, the repositories displayed in connection with application B and application C may be updated to also display the newly-added asset. Similarly, if an asset is removed from a repository displayed in connection with application A, the repositories displayed in connection with application B and application C may also be updated to remove the asset. Thus, multiple instances of a repository are synchronized with each other and each instance of a repository displays the current assets in a repository. In other examples, the above-described process may be varied and is not limited to the processes or sub-processes described above.

Figure 5A:
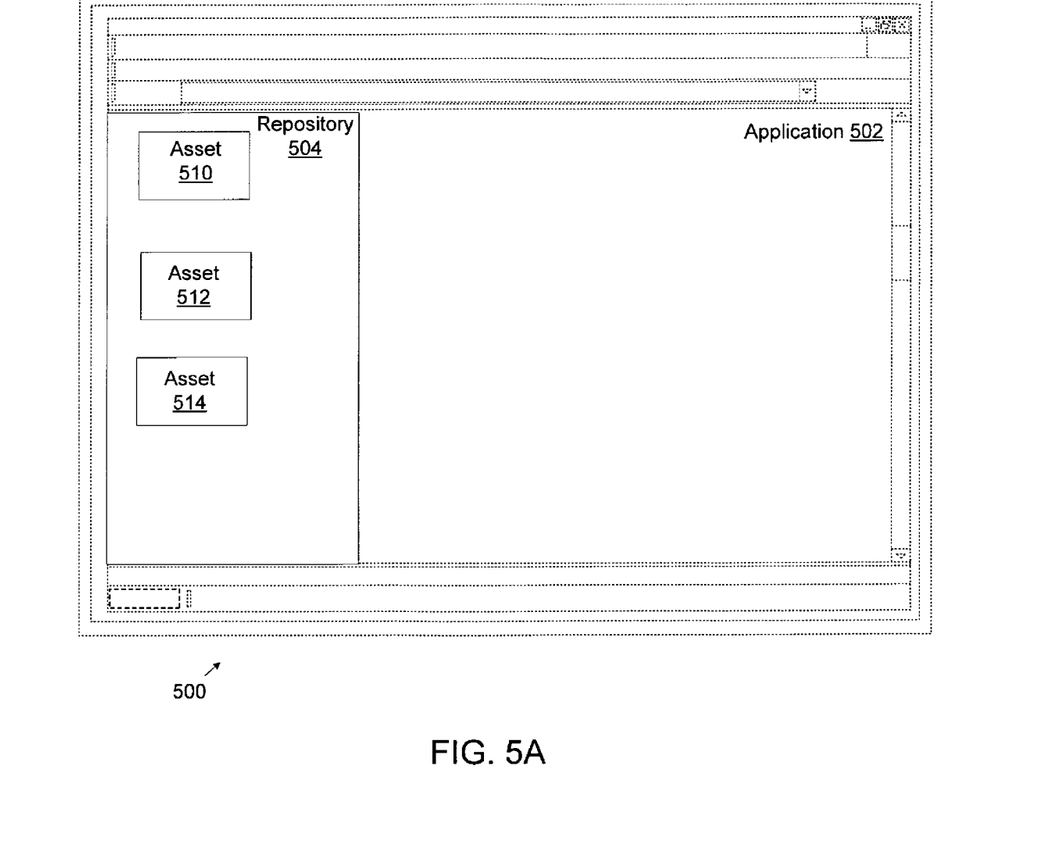
FIG. 5A illustrates an exemplary implementation of an asset repository.

FIG. 5A illustrates an exemplary implementation of an asset repository. Here, system 500 includes application 502, repository 504, and assets 510-514. Although in FIG. 5A, three assets are shown in repository 504, in other examples, the number of assets may be varied. Although system 500 shows one example of an application with repository 504, repository 504 may be implemented differently using other types of applications and the examples described are not limited to any particular software environment as application 202 (FIG. 2) may be implemented using various types of software. Here, repository 504 is displayed in a window within application 502, showing one example of how an application may be configured to access a repository. Thus, a user using application 502 may access assets 510-514 for use within application 502 without exiting the application. Assets 510-514 may be accessed without searching outside of application 502 or using a cumbersome browser dialog. In some examples, assets 510-514 may be copied and used in application 502. In other examples, assets 510-514 may be deleted from repository 504 while using application 502. In yet other examples, additional assets may be added to repository 504 while using application 502. Further, repository 504 may be configured to show accurate representations of the content of assets 510-514. For example, if asset 510 is a picture, repository 504 may display asset 510 as a smaller version of the picture. At a glance, a user may easily determine the assets available for access in repository 504. In other examples, system 500 and the above-described elements may be varied and are not limited to the functions, structures, configurations, or implementations provided.

Figure 5B:
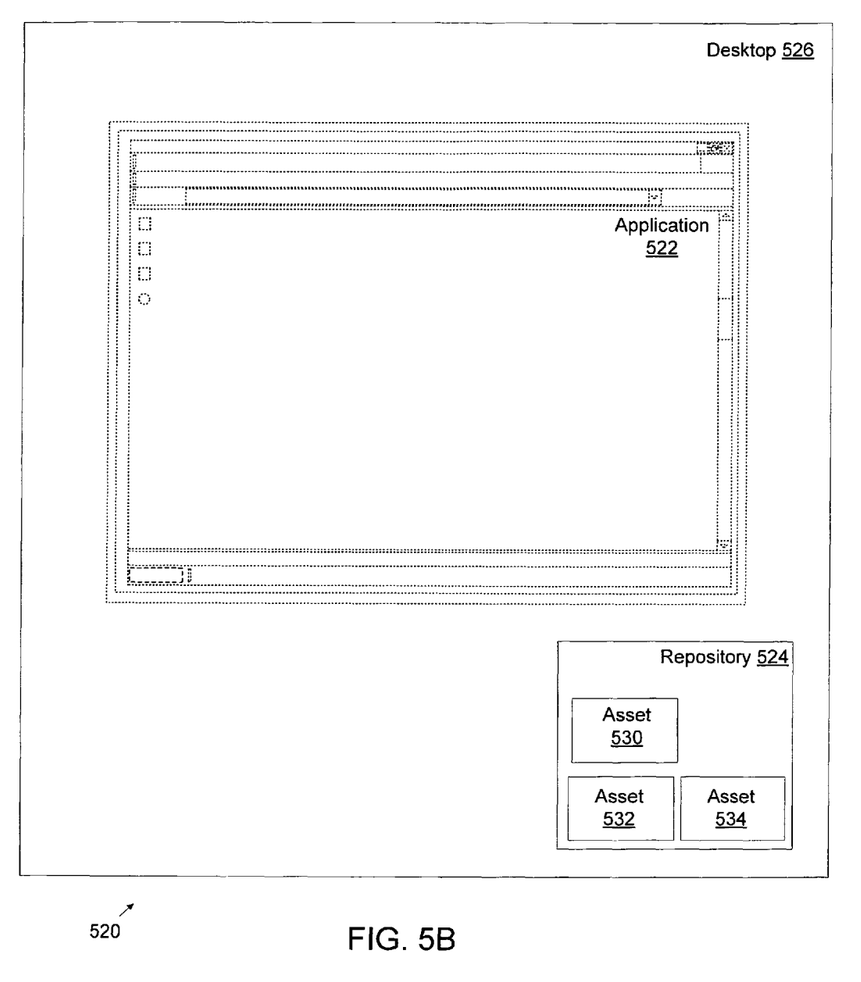
FIG. 5B illustrates an alternative exemplary implementation of an asset repository.

FIG. 5B illustrates an alternative exemplary implementation of an asset repository. Here, system 520 includes application 522, repository 524, desktop 526, and assets 530-534. Although in FIG. 5B, three assets are shown in repository 524, in other examples, the number of assets may be varied. Although system 520 shows an example of a repository on desktop 526, repository 524 may be implemented differently using other types of applications and the examples described are not limited to any particular software environment as application 202 (FIG. 2) may be implemented using various types of software. Here, repository 524 is displayed in a window detached from application 522, showing an example of how an application may be configured to access a repository. In some examples, repository 524 is associated with application 522, but repository 524 is displayed in a separate window to allow for increased visibility of content within application 522. In other examples, repository 524 is a standalone window displayed on desktop 526. Still, a user using application 522 may access assets 530-534 for use within application 522 without exiting the application. Assets 530-534 may be accessed without searching or using a browser dialog. In some examples, assets 530-534 may be copied and used in application 522. In other examples, assets 530-534 may be deleted from repository 524 while using application 522. In yet other examples, additional assets may be added to repository 524 while using application 522. Further, repository 524 may be configured to show accurate representations of the content of assets 530-534, as described above in conjunction with repository 504 (FIG. 5A). In other examples, system 520 and the above-described elements may be varied and are not limited to the functions, structures, configurations, or implementations provided.

Figure 5C:
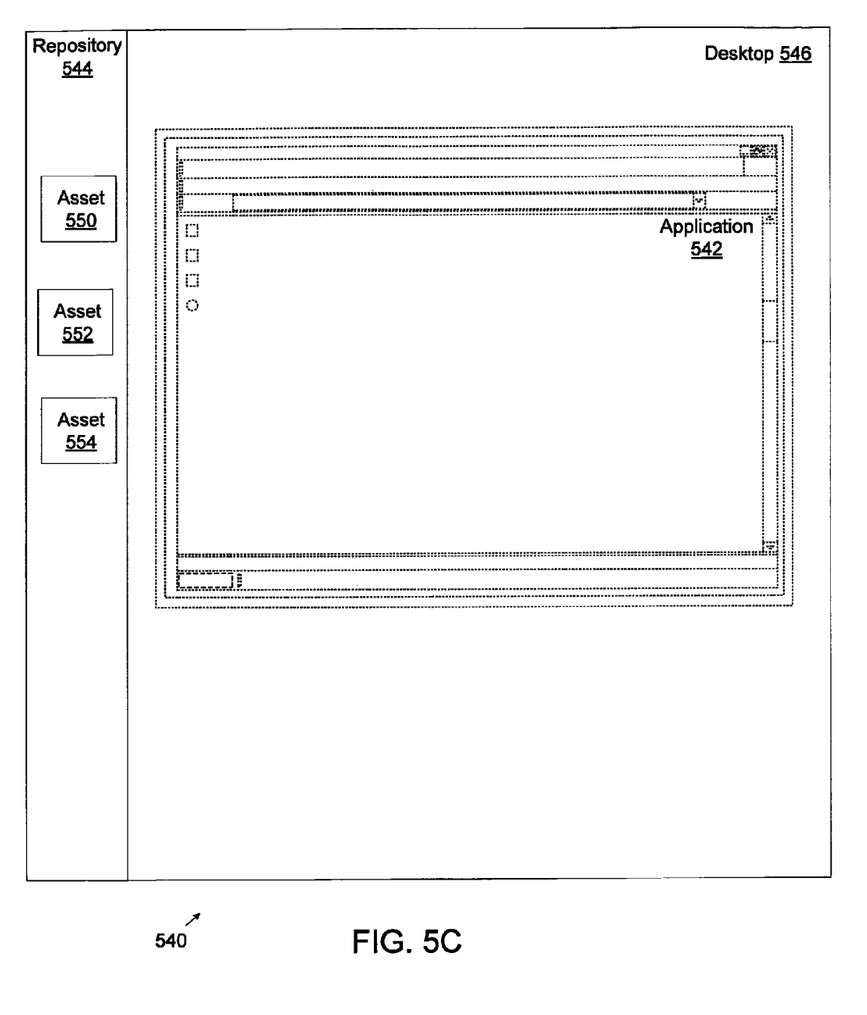
FIG. 5C illustrates another alternative exemplary implementation of an asset repository.

FIG. 5C illustrates another alternative exemplary implementation of an asset repository. Here, system 540 includes application 542, repository 544, desktop 546, and assets 550-554. Although in FIG. 5C, three assets are shown in repository 544, in other examples, the number of assets may be varied. Although system 540 shows one example of a repository on desktop 546, repository 544 may be implemented differently using other types of applications and the examples described are not limited to any particular software environment as application 202 (FIG. 2) may be implemented using various types of software. Here, repository 544 is displayed in a window that is fixed in position on desktop 546. In other examples, repository 544 may be fixed in various other positions on desktop 546. Using application 542, assets 550-554 may be accessed for use within application 542. Assets 550-554 may be accessed without searching or using a browser dialog. In some examples, assets 550-554 may be copied and used in application 542. In other examples, assets 550-554 may be deleted from repository 544. In yet other examples, additional assets may be added to repository 544. Further, repository 544 may be configured to show accurate representations of the content of assets 550-554, as described above in conjunction with repository 504 (FIG. 5A). In other examples, system 540 and the above-described elements may be varied and are not limited to the functions, structures, configurations, or implementations provided.

Figure 5D:
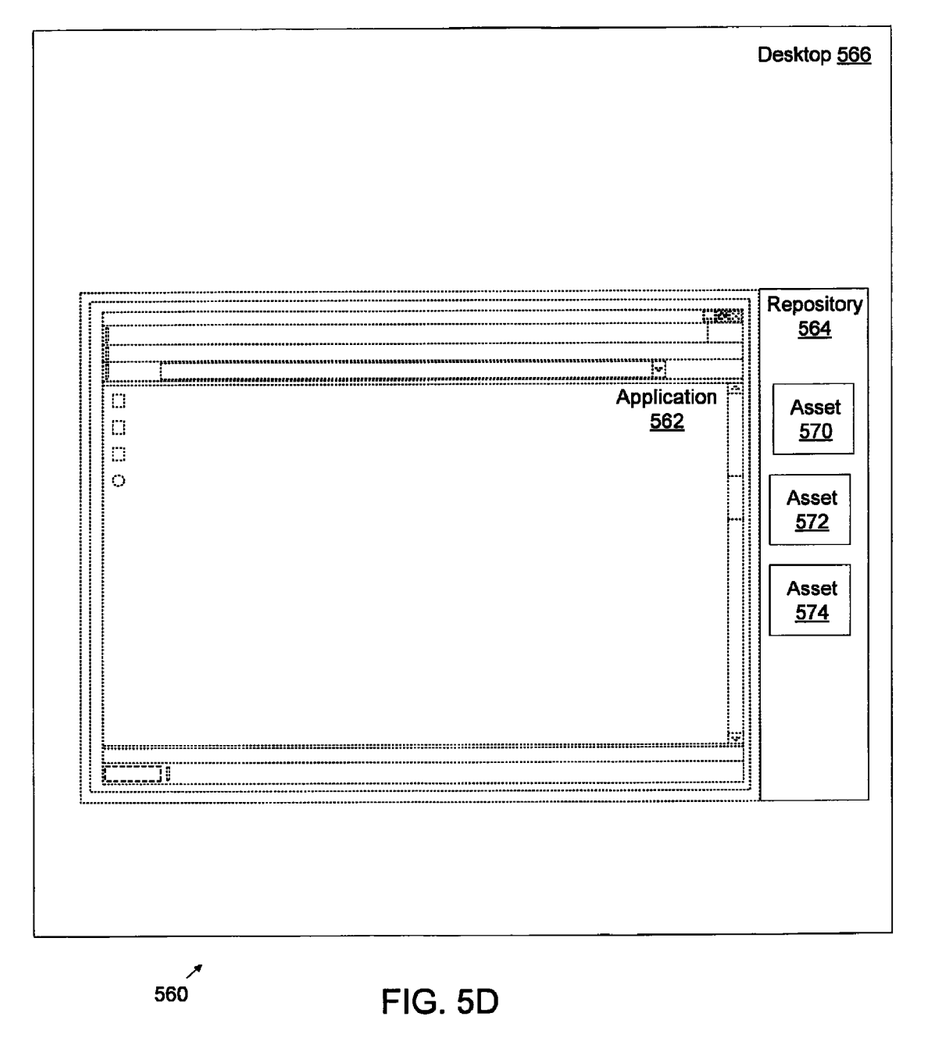
FIG. 5D illustrates yet another alternative exemplary implementation of an asset repository.

FIG. 5D illustrates yet another alternative exemplary implementation of an asset repository. Here, system 560 includes application 562, repository 564, desktop 566, and assets 570-574. Although in FIG. 5D, three assets are shown in repository 564, in other examples, the number of assets may be varied. Although system 560 shows one example of an application with repository 564, repository 564 may be implemented differently using other types of applications and the examples described are not limited to any particular software environment as application 202 (FIG. 2) may be implemented using various types of software. Here, repository 564 is displayed in a window attached to the side of application 562. In other examples, repository 564 may be displayed in a window attached to the other side, the top, or the bottom of application 562. A user using application 562 may access assets 570-574 for use within application 562 without exiting the application. Assets 570-574 may be accessed without searching outside of application 562 or using a cumbersome browser dialog. In some examples, assets 570-574 may be copied and used in application 562. In other examples, assets 570-574 may be deleted from repository 564 while using application 562. In yet other examples, additional assets may be added to repository 564 while using application 562. Further, repository 564 may be configured to show accurate representations of the content of assets 570-574, as described above in conjunction with repository 504 (FIG. 5A). In other examples, system 560 and the above-described elements may be varied and are not limited to the functions, structures, configurations, or implementations provided.

Figure 6:
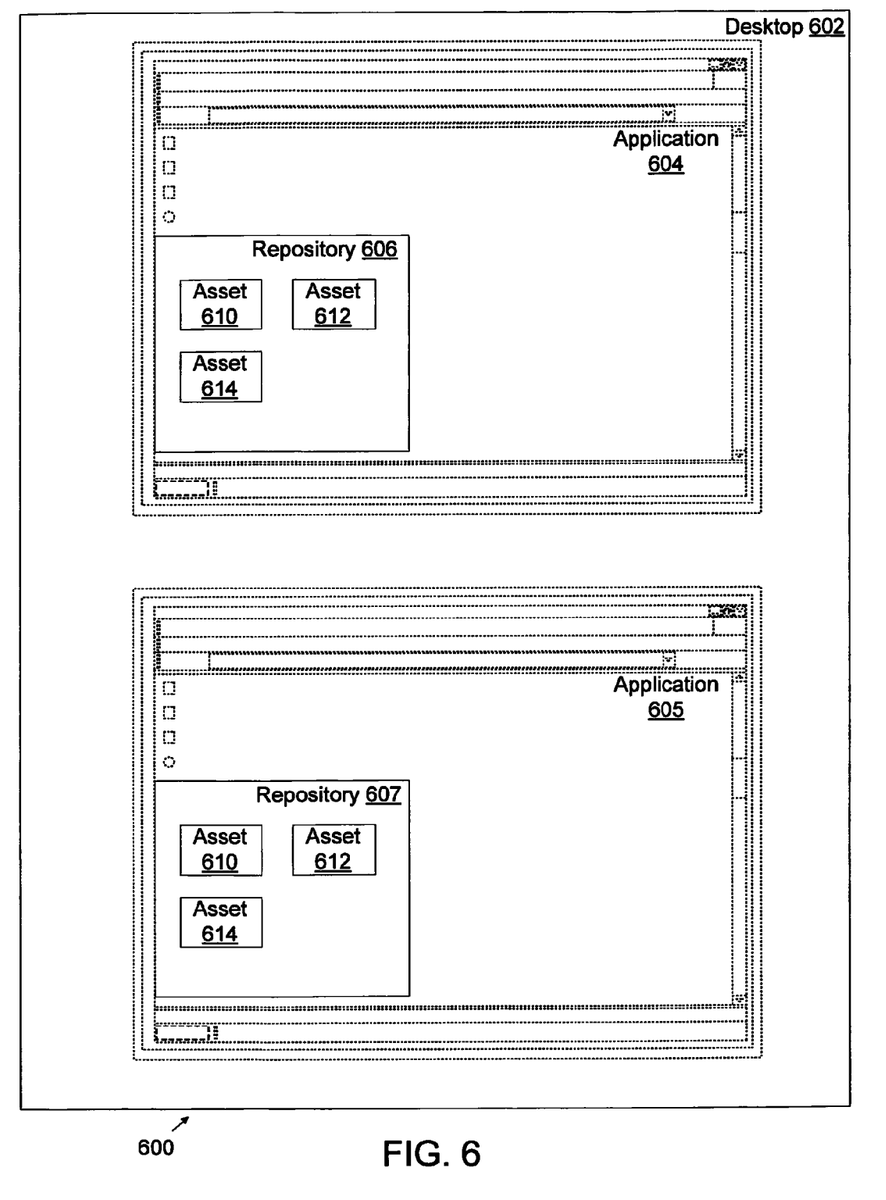
FIG. 6 illustrates still another exemplary implementation of an asset repository.

FIG. 6 illustrates still another exemplary implementation of an asset repository. Here, system 600 includes desktop 602, applications 604-605, repositories 606-607, and assets 610-614. Although in FIG. 6, three assets are shown in repositories 606-607, in other examples, the number of assets may be varied. Although system 600 shows one example of applications with repositories 606-607, repositories 606-607 may be implemented differently using other types of applications and the examples described are not limited to any particular software environment as application 202 (FIG. 2) may be implemented using various types of software. As discussed above, if multiple applications are configured to access repositories 606-607, there is an instance displayed in each of the applications, resulting in multiple instances of a repository (i.e., repositories 606-607). Here, repository 606 is an instance displayed in a window within application 604 and repository 607 is another instance displayed in a window within application 605. Here, there are two applications configured to access a repository (i.e., repositories 606-607) and there is an instance displayed in each of the applications, resulting in two instances, repository 606 and repository 607. A user using application 604 may access assets 610-614 through repository 606 for use within application 604 without exiting the application. A user using application 605 may access assets 610-614 through repository 607 for use within application 605 without exiting the application. Assets 610-614 may be accessed without searching outside of applications 604-605 or using a cumbersome browser dialog. In some examples, assets 610-614 may be copied and used in applications 604-605. In other examples, assets 610-614 may be deleted from repository 606 while using application 604 or deleted from repository 607 while using application 605. In yet other examples, additional assets may be added to repository 606 while using application 604 or added to repository 607 while using application 605. As described above, multiple instances of a repository are synchronized with each other. Thus, if an asset is added to or removed from repository 606 while using application 604, repository 607 is updated to reflect the same changes. Similarly, if an asset is added to or removed from repository 607 while using application 605, repository 606 is updated to reflect the same changes. Here, repositories 606-607 are synchronized to display assets 610-614. Further, repositories 606-607 may be configured to show accurate representations of the content of assets 610-614, as described in conjunction with repository 504 (FIG. 5A). In other examples, system 600 and the above-described elements may be varied and are not limited to the functions, structures, configurations, or implementations provided.

Figure 7:
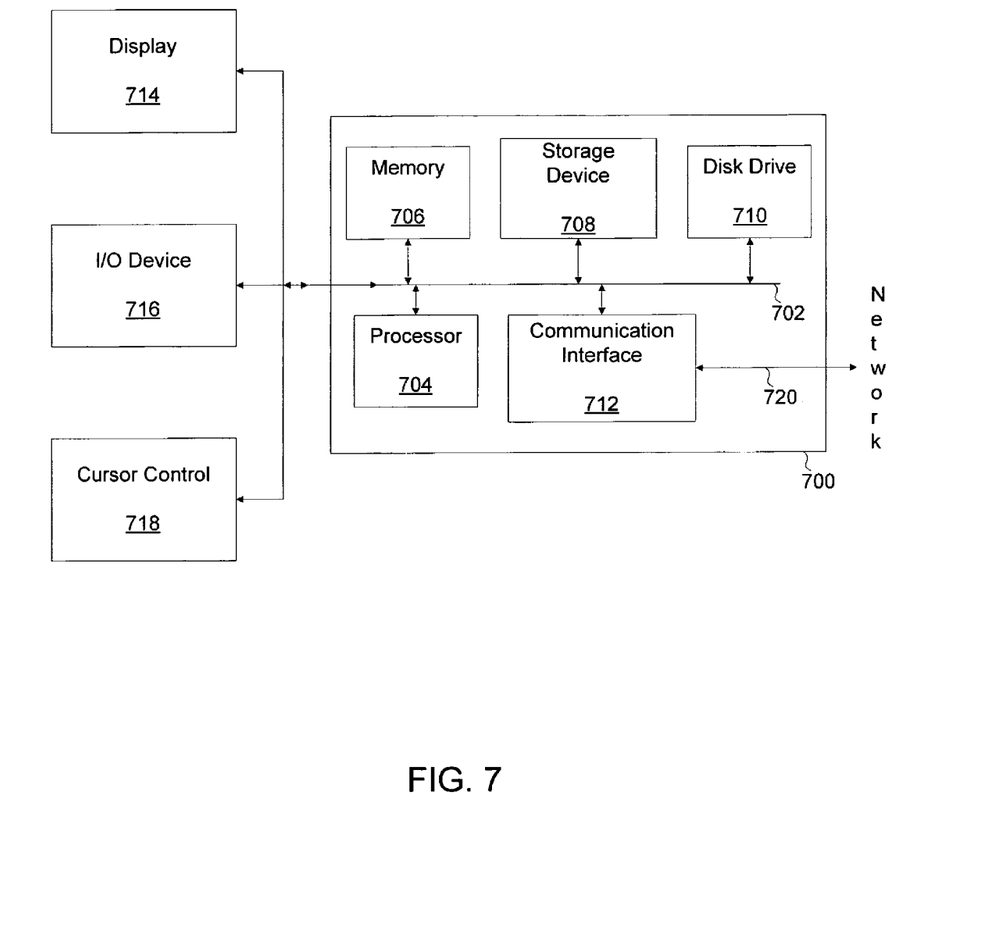
FIG. 7 illustrates an exemplary computer system suitable for an asset repository.

FIG. 7 illustrates an exemplary computer system suitable for an asset repository. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
   storing assets for a repository into a storage device, wherein the assets for the repository comprise multiple different file types, and remain persistently stored within the storage device even when power is removed;
   displaying, in a corresponding window of each application of multiple different applications, a separate instance of the repository, wherein:
      the multiple different applications comprise multiple different types of applications accessing the assets' multiple different file types;
      the separate displayed instance of the repository shows representations of the assets currently stored for the repository within the storage device; and
      each application of the multiple different applications is configured to perform, without exiting the application:
         accessing, through the corresponding window of the application, the assets currently stored for the repository within the storage device without searching outside of the application; and
         removing assets from, and adding assets to, the assets currently stored for the repository within the storage device; and
   synchronizing the separate displayed instances of the repository in response to said accessing the assets, said removing, or said adding, so that the representations shown by the synchronized separate instances displayed in the multiple different applications all reflect the assets that are currently stored for the repository within the storage device.

2. The method of claim 1, wherein said storing the assets for the repository further comprises configuring the assets for the repository to be copied and used in the multiple different applications.

3. The method of claim 1, wherein the multiple different applications perform said accessing the assets currently stored for the repository within the storage device without using a browser dialog.

4. The method of claim 1, wherein one or more of the corresponding windows is attached to the corresponding one or more applications of the multiple different applications.

5. The method of claim 1, wherein one or more of the corresponding windows is detached from the corresponding one or more applications of the multiple different applications.

6. The method of claim 1, wherein one or more of the corresponding windows appears within the corresponding one or more applications of the multiple different applications.

7. A system, comprising:
a memory configured to store data associated with a repository; and
a processor configured to perform:
storing assets for the repository into a storage device, wherein the assets for the repository comprise multiple different file types, and remain persistently stored within the storage device even when power is removed;
displaying, in a corresponding window of each application of multiple different applications, a separate instance of the repository, wherein:
the multiple different applications comprise multiple different types of applications accessing the assets' multiple different file types;
the separate displayed instance of the repository shows representations of the assets currently stored for the repository within the storage device; and
each application of the multiple different applications is configured to perform, without exiting the application:
accessing, through the corresponding window of the application, the assets currently stored for the repository within the storage device without searching outside of the application; and
removing assets from, and adding assets to, the assets currently stored for the repository within the storage device; and
synchronizing the separate displayed instances of the repository in response to said accessing the assets, said removing, or said adding, so that the representations shown by the synchronized separate instances displayed in the multiple different applications all reflect the assets that are currently stored for the repository within the storage device.

8. The system of claim 7, wherein the multiple different applications perform said accessing the assets currently stored for the repository within the storage device without using a browser dialog.

9. The system of claim 7, wherein the multiple different applications include a software application, a web browser, and a system desktop.

10. The system of claim 7, wherein the multiple different file types comprise content formatted in various types of formats.

11. The system of claim 7, wherein the corresponding window is a stand-alone window displayed on a desktop.

12. A non-transitory computer-readable storage medium storing computer instructions for:
storing assets for a repository into a storage device, wherein the assets for the repository comprise multiple different file types, and remain persistently stored within the storage device even when power is removed;
displaying, in a corresponding window of each application of multiple different applications, a separate instance of the repository, wherein:
the multiple different applications comprise multiple different types of applications accessing the assets' multiple different file types;
the separate displayed instance of the repository shows representations of the assets currently stored for the repository within the storage device; and
each application of the multiple different applications is configured to perform, without exiting the application:
accessing, through the corresponding window of the application, the assets currently stored for the repository within the storage device without searching outside of the application; and
removing assets from, and adding assets to, the assets currently stored for the repository within the storage device; and
synchronizing the separate displayed instances of the repository in response to said accessing the assets, said removing, or said adding, so that the representations shown by the synchronized separate instances displayed in the multiple different applications all reflect the assets that are currently stored for the repository within the storage device.

13. The non-transitory computer-readable storage medium of claim 12, wherein the multiple different applications perform said accessing the assets currently stored for the repository within the storage device without using a browser dialog.

14. The non-transitory computer-readable storage medium of claim 12, wherein one or more of the corresponding windows is attached to the corresponding one or more applications of the multiple different applications.

15. The non-transitory computer-readable storage medium of claim 12, wherein one or more of the corresponding windows is detached from the corresponding one or more applications of the multiple different applications.

16. The non-transitory computer-readable storage medium of claim 12, wherein one or more of the corresponding windows appears within the corresponding one or more applications of the multiple different applications.

* * * * *